(12) United States Patent
Steinmaurer et al.

(10) Patent No.: US 10,145,460 B2
(45) Date of Patent: Dec. 4, 2018

(54) GEAR ARRANGEMENT

(71) Applicant: Miba Sinter Austria GmbH, Laakirchen (AT)

(72) Inventors: Manuel Steinmaurer, Steinerkirchen (AT); Martin Hessmann, Linz (AT); Wolfgang Siessl, Traunkirchen (AT); Karl Dickinger, Vorchdorf (AT)

(73) Assignee: Miba Sinter Austria GmbH, Laakirchen (AT)

( * ) Notice: Subject to any disclaimer, the term of this patent is extended or adjusted under 35 U.S.C. 154(b) by 0 days.

(21) Appl. No.: 15/631,290

(22) Filed: Jun. 23, 2017

(65) Prior Publication Data
US 2018/0017151 A1   Jan. 18, 2018

(30) Foreign Application Priority Data

Jul. 18, 2016 (AT) .............................. A 50645/2016

(51) Int. Cl.
| | |
|---|---|
| *F16H 55/14* | (2006.01) |
| *F16H 57/00* | (2012.01) |
| *F16H 55/17* | (2006.01) |
| *F16H 57/12* | (2006.01) |
| *F16H 55/56* | (2006.01) |

(52) U.S. Cl.
CPC ......... *F16H 57/0006* (2013.01); *F16H 55/17* (2013.01); *F16H 55/566* (2013.01); *F16H 57/12* (2013.01)

(58) Field of Classification Search
CPC ............... F16H 55/18; F16H 2057/126; F16H 2057/127; F16H 55/17; F16H 57/12; F16H 57/0006
See application file for complete search history.

(56) References Cited

U.S. PATENT DOCUMENTS

| | | | |
|---|---|---|---|
| 7,733,378 B2 | 6/2010 | Kaneko et al. | |
| 8,695,449 B2 * | 4/2014 | Lang ...................... | F16H 55/14 74/409 |
| 9,121,494 B2 | 9/2015 | Buchleitner | |
| 9,297,451 B2 | 3/2016 | Buchleitner | |
| 9,322,465 B2 | 4/2016 | Sandner | |

(Continued)

FOREIGN PATENT DOCUMENTS

| | | | |
|---|---|---|---|
| AT | 507 071 B1 | 2/2010 | |
| AT | 508 701 B1 | 5/2011 | |

(Continued)

*Primary Examiner* — Jake Cook
(74) *Attorney, Agent, or Firm* — Collard & Roe, P.C.

(57) ABSTRACT

A gear arrangement with a divided spur toothing includes a main gear and a gear rotatable to the latter in a circumferential direction. The main gear has a hub on which the rotatable gear is arranged. A spring element is arranged between the main gear and the rotatable gear. With the spring element, the rotatable gear is pretensioned in the circumferential direction against the main gear. A first spur toothing part of the spur toothing is formed on the main gear and a second spur toothing part of the spur toothing is formed on the rotatable gear. The first spur toothing part has a first axis of rotation and the second spur toothing part has a second axis of rotation. The second axis of rotation of the second spur toothing part is offset relative to the first axis of rotation of the first spur toothing part.

2 Claims, 3 Drawing Sheets

(56) References Cited

U.S. PATENT DOCUMENTS

| | | |
|---|---|---|
| 9,410,606 B2 | 8/2016 | Viechtbauer et al. |
| 2008/0141811 A1 | 6/2008 | Sandner |
| 2014/0116174 A1 | 5/2014 | Sandner |
| 2014/0360300 A1 | 12/2014 | Viechtbauer et al. |

FOREIGN PATENT DOCUMENTS

| | | |
|---|---|---|
| AT | 510 283 B1 | 3/2012 |
| AT | 513 246 B1 | 3/2014 |
| AT | 514 070 B1 | 10/2014 |
| DE | 10 2009 015 958 A1 | 9/2010 |
| DE | 10 2009 015 946 A1 | 10/2010 |
| DE | 10 2009 015 947 A1 | 10/2010 |
| DE | 10 2009 015 953 A1 | 10/2010 |
| DE | 10 2013 110 396 A1 | 4/2014 |
| WO | 2005/009030 A1 | 1/2005 |
| WO | 2005/090830 A1 | 9/2005 |

* cited by examiner

GEAR ARRANGEMENT

CROSS REFERENCE TO RELATED APPLICATIONS

Applicant claims priority under 35 U.S.C. § 119 of Austrian Application No. A 50645/2016 filed on Jul. 18, 2016, the disclosure of which is incorporated by reference.

The invention relates to a gear arrangement with a divided spur toothing, comprising a main gear and a gear rotatable to the latter in circumferential direction, wherein the main gear has a hub on which the rotatable gear is arranged, and comprising a spring element which is arranged between the main gear and the rotatable gear, and by which the rotatable gear is pretensioned in circumferential direction against the main gear, wherein a first spur toothing part of the spur toothing is formed on the main gear and a second spur toothing part of the spur toothing is formed on the rotatable gear, and the first spur toothing part has a first axis of rotation and the second spur toothing part has a second axis of rotation.

Such gear arrangements, which are used for the play clearance of intermeshing gears, are already known from the prior art.

Thus for example WO 2005/090830 A1 describes a gear for a play-free spur gear stage with a hub, comprising a sprocket supported by the hub, which sprocket is divided along an axially normal parting plane into two part rims, namely into a rim part secured to the hub and a rim ring mounted to be coaxially rotatable relative to the latter, and with an annular spring surrounding the hub which is supported at its opposite ends in circumferential direction on support webs formed in one piece with the two part rims and overlapping one another in axial direction, which support webs are arranged behind one another in the circumferential direction of the sprocket. The gear ring is secured axially on the hub for example by means of a circlip.

Further similar gear arrangements are known from AT 507 071 B1, AT 508 701 B1, AT 510 283 B1, AT 513 246 B1 and AT 514 070 B1.

It has been shown during the operation of such gear arrangements that in some circumstances the latter produce disruptive noises.

The objective of the invention is to improve the aforementioned gear arrangement in terms of its acoustic behaviour.

Said objective is achieved in the aforementioned gear arrangement in that the second axis of rotation of the second spur toothing part is offset relative to the first axis of rotation of the first spur toothing part.

It is an advantage here that by means of the coaxial offset of the axes of rotation of the two spur toothing parts it is possible to compensate for the guiding play of the rotatable gear on the main gear in the region of the second spur toothing part. Furthermore, both spur toothing parts have improved engagement in the toothing of the gear meshing with the gear arrangement, as the displacement of the second spur toothing part caused by the guiding play can be compensated by the coaxial offset of the axes of rotation. This more optimal engagement results in a reduction of the sound produced during the meshing of the two gears. Furthermore, it has been found that by means of the improved meshing of the two gears it is also possible to reduce the wear on the toothing of the rotatable gear. The geometry of the toothing which is optimised for the respective purpose is thus more effective.

According to one embodiment variant of the gear arrangement it is possible that the maximum offset of the second axis of rotation to the first axis of rotation is at an angle in the range of between 60° and 120° to a first support web for the spring element arranged on the main gear. It has been shown during the operation of the gear arrangement that the aforementioned effects can be improved further with such a gear arrangement of this design.

It is also possible for the rotatable gear to be guided internally and/or externally on the main gear. In other words, the guiding circle diameter can be designed to be coaxial to the axis of rotation of the main gear. By means of this design of the gear arrangement the latter can be produced more easily as the coaxial offset is limited solely to the axis of rotation of the second spur toothing part.

For a better understanding of the invention the latter is explained in more detail with reference to the following Figures.

Figure 1:
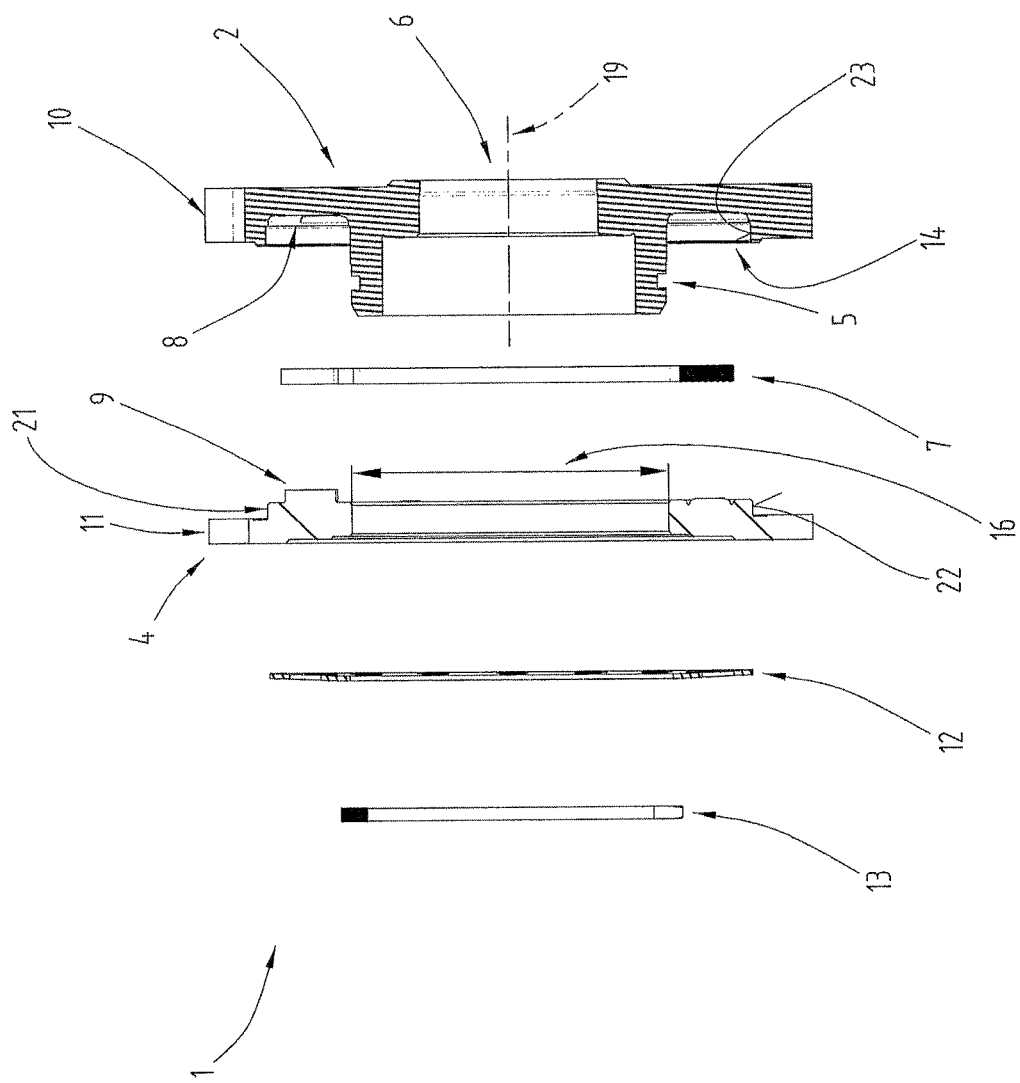
FIG. 1 shows a gear arrangement in exploded view.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position.

Figure 2:
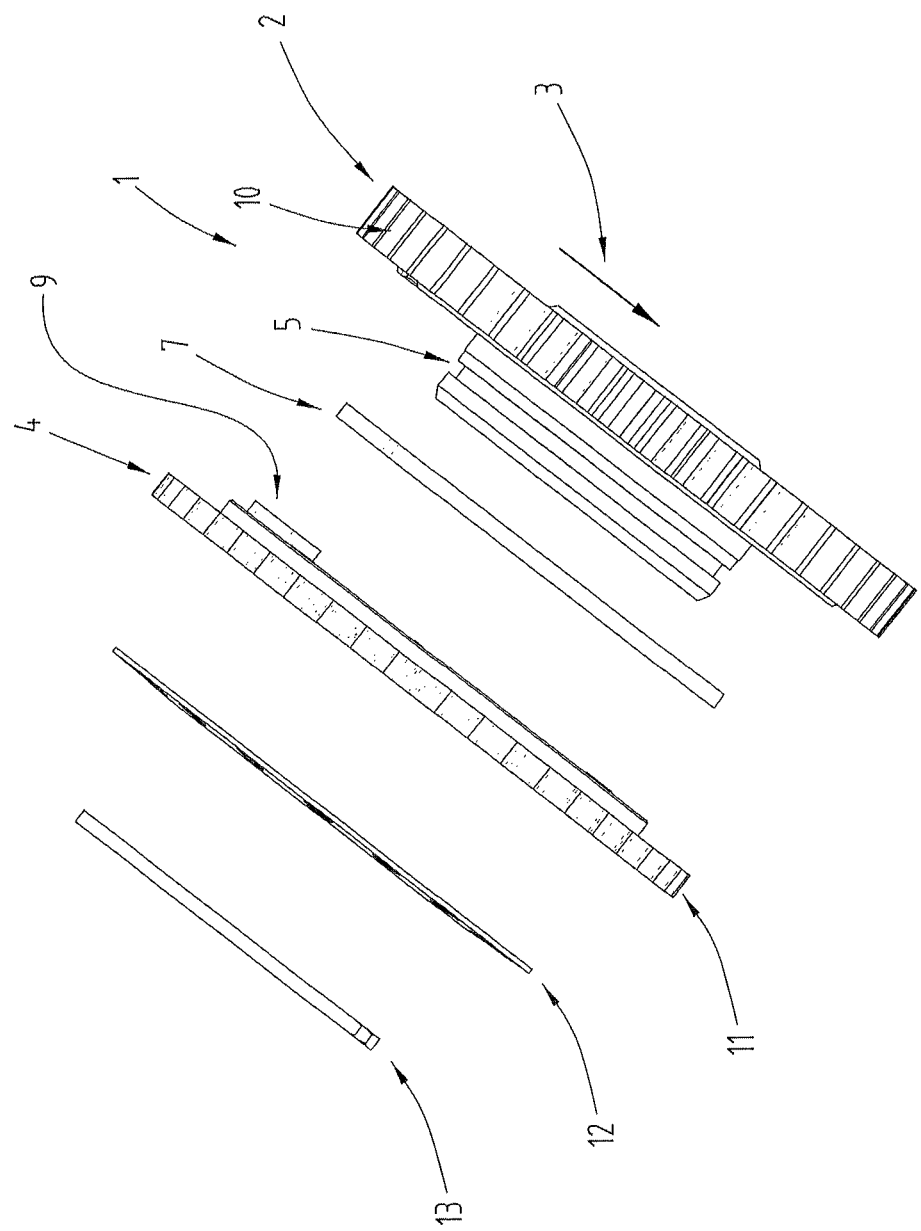
FIG. 2 shows the gear arrangement according to FIG. 1 in exploded view and perspective view.
Figure 3:
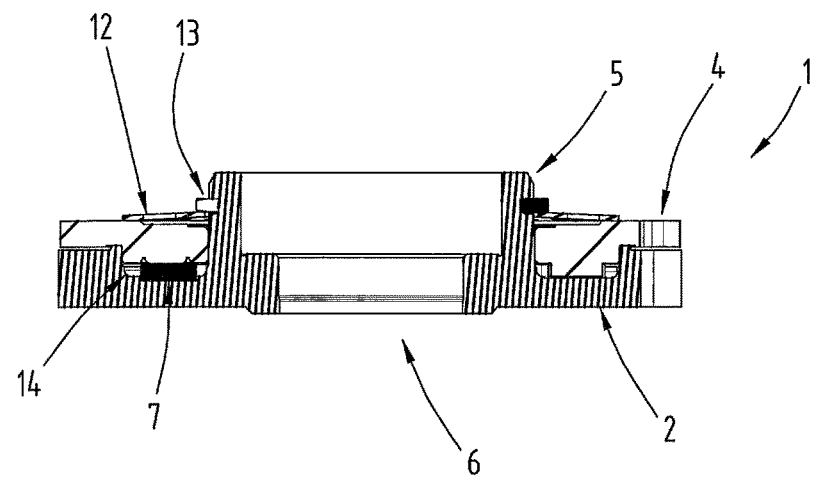
FIG. 3 shows a cross-section of the gear arrangement according to FIG. 1 in an assembled state.

FIG. 1 to 3 show a gear arrangement 1 in an exploded view and in cross-section. Said gear arrangement 1, also referred to as a "split-gear", comprises a main gear 2 and a gear 4 rotatable relative to the latter in circumferential direction 3, wherein the main gear 2 comprises a hub 5 which is designed in particular in one piece with the main gear 2. The rotatable gear 4 is arranged rotatably on the hub 5 of the main gear 2.

The main gear 2 can also be referred to as a fixed gear which is connected in a rotationally secure manner to a not shown shaft. The term "fixed" relates to being rotationally secure relative to said shaft, but of course this does not mean that the main gear 2 does not rotate. However, the main gear 2 is "fixed" relative to the rotatable gear 4.

The rotational securing of the main gear 2 can be provided as known from the prior art, for example by shrinking, or by means of a plug-in toothing etc.

The hub 5 can have a recess 6 in the form of a central bore for its arrangement or mounting on the shaft.

The rotatable gear 4 is pretensioned by means of a spring element 7, which is formed in this case by a so-called Ω-spring, in circumferential direction 3 relative to the main gear 2, as known from the aforementioned prior art. For the pretensioning a support web 8 is formed on the main gear 2 and a support web 9 is formed on the rotatable gear 4. The spring element 7 bears on said support webs 8, 9 with both its open end sections. In the mounted state of the gear arrangement 1 the two support webs 8, 9 bear on one another so that there is no gap between the latter. However, it is also possible for the two support webs 8, 9 to be spaced apart from one another in the assembled state.

The support web 8 is designed in particular in one piece with the main gear 2 and protrudes in the direction of the rotatable gear 4 over the surface on which it is arranged. The support web 9 is designed in particular in one piece with the rotatable gear 4 and protrudes in the direction of the main gear 2 over the surface, on which it is arranged.

The gear arrangement 1 comprises a spur toothing on an outer circumference, wherein a first spur toothing part 10 extends over the circumference of the main gear 2 and a second spur toothing part 11 extends over the circumference of the rotatable gear 4. The spur toothing is thus divided in axial direction into the two spur toothing parts 10, 11.

It should be noted that the spur toothing parts 10, 11 relate solely to the toothings of the main gear 2 and the rotatable gear 4 and not to the areas of the main gear 2 and the rotatable gear 4 located underneath the respective tooth base circle.

Furthermore, it should be noted that the rotatable gear 4 cannot rotate at any angle relative to the main gear 2. Rather rotatability is defined in this description such that the rotatable gear 4 can rotate about a specific maximum angle value relative to the main gear 2, wherein said maximum angle value originates from the tooth flank play which is produced when meshing the spur toothing of the gear arrangement with the spur toothing of a further gear.

In order to pretension the additional rotatable gear 4 also in axial direction against the main gear 2, a further spring element 12 can be arranged, e.g. in the form of a disc spring. The additional spring element 12 can be arranged for example on the hub 5 of the main gear 2 in axial direction behind the rotatable gear 2, so that the rotatable gear 4 is arranged between the main gear 2 and the additional spring element 12.

To secure the relative position of the rotatable gear 4 to the main gear 2 in axial direction a securing element 13 can be provided, for example a circlip. The securing element 13 can also be arranged on the hub 5 of the main gear 2. The securing element 13 can be arranged in the presence of the further spring element 12 resting on its rear side so that the additional spring element 12 is arranged in axial direction between the rotatable gear 4 and the securing element 13.

The spring element 7 arranged in axial direction between the main gear 2 and the rotatable gear 4 can be arranged in an annular groove 14, which is formed in the main gear 2.

In the documents of the prior art mentioned above the main gear and the rotatable gear are arranged to be completely coaxial to one another. In contrast to this with the present gear arrangement the second spur toothing part 11 is offset coaxially to the first spur toothing part 10. In other words the two spur toothing parts 10, 11 have different axes of symmetry.

It should be noted that the two spur toothing parts 10, 11 are designed to be similar, i.e. have both the same cross-sectional geometry (as viewed in axial direction) of the teeth and the same module.

Figure 4:
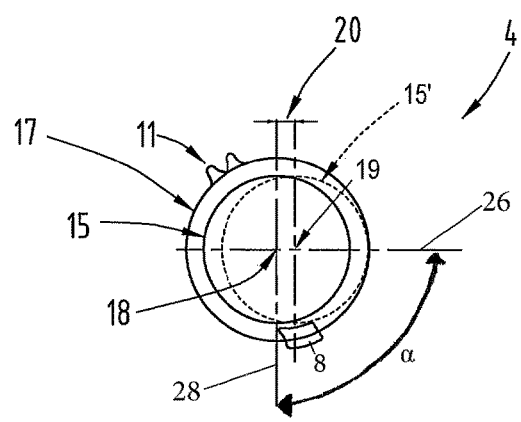
FIG. 4 shows a section of the rotatable gear of the gear arrangement.

In order to illustrate the coaxial offset FIG. 4 shows a section of the rotatable gear 4. An inner circle 15 is defined by an inner diameter 16 (FIG. 1) of the rotatable gear 4. The inner diameter 16 is thereby the diameter of the opening (bore) of the rotatable gear 4, which is used for mounting the hub 5 of the main gear 2. An outer circle 17 is defined however by the tooth base circle of the second spur toothing part 11, which is only indicated in FIG. 4. The displacement 15' of the inner circle is shown by a dashed line in FIG. 4.

It should be noted that the representation of the displacement has been exaggerated. In particular, FIG. 4 does not show additional structural details of the gear body of the rotatable gear 4 to better illustrate the displacement.

By means of the coaxial displacement the gear body, i.e. the part of the rotatable gear 4 below the tooth base circle, has a different axis of rotation than the second spur toothing part 11. The spur toothing part 11 has a second axis of rotation 18. Since the rotatable gear 4 is arranged on the hub 5 of the main gear 2 (FIG. 3) the axis of rotation of the gear body is the same as a first axis of rotation 19 (FIG. 1) of the main gear 2. The second axis of rotation 18 of the second spur toothing part 11 is arranged to be offset to the first axis of rotation 19 of the first spur toothing part 10. A line 26 includes the offset and runs from the second axis of rotation 18 through the first axis of rotation 19.

A distance 20 between the first axis of rotation 19 and the second axis of rotation 18 can be for example between 50 μm and 500 μm.

The axial offset of the first to the second axis of rotation 18, 19 of the two spur toothing parts 10, 11 is taken into account during the production of the rotatable gear 4. It is particularly simple if the rotatable gear 4 is produced according to a sintering method, as then only the die has to be shaped accordingly. In principle it is also possible however to perform a subsequent machining of the rotatable gear 4, wherein in this case the rotatable gear 4 is produced to have an extra dimension at the corresponding points.

During tests that were carried out it was established that the offset of the first to the second axis of rotation 18, 19 is particularly advantageous within a specific angular range—as viewed in circumferential direction 3 (FIG. 2). Therefore, according to one embodiment variant of the gear arrangement 1 it is possible that the maximum offset of the second axis of rotation 18 of the second spur toothing part 11 relative to the first axis of rotation 19 of the first spur toothing part 10 is at an angle in a range of between 60° and 120° to the first support web 8 for the spring element 7 (FIG. 1) arranged on the main gear. For example, the maximum offset can be at an angle of about 90°, as shown in FIG. 4. In other words, a first line 26 includes the offset and runs from the second axis of rotation 18 and through the first axis of rotation 19. A second line 28 runs between the second axis of rotation 18 and the first support web 8. The first line 26 and the second line 28 enclose an angle α in a range of between 60° and 120°. The angle α in the embodiment shown in FIG. 4 is about 90°. By means of this maximum offset the distance between the two spur toothing parts 10, 11 is the greatest in this angular range.

Although the second axis of rotation 18 is eccentric to the first axis of rotation 19 the two axes of rotation of the main gear body (the main gear bodies are the parts of the main gear 2 or the rotatable gear 4 which are underneath the tooth base circle of the spur toothing parts 10, 11) are designed to be coaxial to one another. In particular, also the first axis of rotation 19 of the first spur toothing part 10 is designed to be coaxial to the latter. It is thus possible for the rotatable gear 4 to be guided internally on the hub 5 (FIG. 1).

Alternatively, it is possible for the rotatable gear 4 to be designed to be guided externally. For this purpose a guide web 21 can be formed on the rotatable gear 4, in particular over the whole circumference (FIG. 1). The guide web 21 dips in the assembled state of the gear arrangement 1 into the annular groove 14 or into an annular groove of the main gear 2. Furthermore, the guide web 21 comprises a radially external guide surface 22 which bears on a counter guide surface 23 of the main gear 2 and is arranged immediately adjacent to the said counter guide surface 23. The counter guide surface 23 is formed by the radially outer side wall of the annular groove 14 or an annular groove of the main gear 2.

According to a further embodiment variant of the gear arrangement 1 it is possible for the rotatable gear 4 to be guided both internally and externally on the main gear 2. The rotatable gear 2 can thus be guided both on the hub 5 of the main gear and also by the guide web 21 (as explained above).

The respective guiding circle diameters are arranged in particular to be coaxial to one another.

The example embodiments show and describe possible embodiment variants of the gear arrangement 1, wherein it should be noted at this point that also various different combinations of the individual embodiment variants with one another are also possible.

Lastly, for the sake of formality it should be noted that for a better understanding of the structure of the gear arrangement 1 the latter has not necessarily been drawn to scale.

LIST OF REFERENCE NUMERALS 1 gear arrangement
2 main gear
3 circumferential direction
4 gear
5 hub
6 recess
7 spring element
8 support web
9 support web
10 spur toothing part
11 spur toothing part
12 spring element
13 securing element
14 annular groove
15 circle
16 inner diameter
17 circle
18 axis of rotation
19 axis of rotation
20 distance
21 guide web
22 guide surface
23 counter guide surface

The invention claimed is:

1. A gear arrangement with a divided spur toothing, comprising
   a main gear,
   a gear rotatable relative to the latter in a circumferential direction, wherein the main gear has a hub on which the rotatable gear is arranged,
   a spring element which is arranged between the main gear and the rotatable gear and with which the rotatable gear is pretensioned in the circumferential direction against the main gear, and
   a first support web for the spring element, the first support web being arranged on the main gear,
   wherein a first spur toothing part of the spur toothing is formed on the main gear and a second spur toothing part of the spur toothing is formed on the rotatable gear,
   wherein the first spur toothing part has a first axis of rotation,
   wherein the second spur toothing part has a second axis of rotation,
   wherein the second axis of rotation of the second spur toothing part is offset relative to the first axis of rotation of the first spur toothing part
   wherein a first line includes the offset and runs from the second axis of rotation and through the first axis of rotation,
   wherein a second line runs from the second axis of rotation to the first web, and
   wherein the first line and the second line enclose an angle in a range of between 60° and 120°.

2. The gear arrangement as claimed in claim 1, wherein the rotatable gear is guided internally and/or externally on the main gear.

* * * * *